United States Patent [19]

Badesha et al.

[11] Patent Number: 5,480,938
[45] Date of Patent: Jan. 2, 1996

[54] LOW SURFACE ENERGY MATERIAL

[75] Inventors: Santokh S. Badesha, Pittsford; George J. Heeks, Rochester; Arnold W. Henry, Pittsford; David H. Pan, Rochester; Louis D. Fratangelo, Fairport; Robert M. Ferguson, Penfield, all of N.Y.

[73] Assignee: Xerox Corporation, Stamford, Conn.

[21] Appl. No.: 155,351

[22] Filed: Nov. 22, 1993

[51] Int. Cl.⁶ .................................................. C08L 83/05
[52] U.S. Cl. ............................................. 525/104; 525/102
[58] Field of Search ...................................... 525/104, 102

[56] References Cited

U.S. PATENT DOCUMENTS

| | | | |
|---|---|---|---|
| 4,029,827 | 6/1977 | Imperial et al. | 427/22 |
| 4,101,686 | 7/1978 | Strella et al. | 427/22 |
| 4,185,140 | 1/1980 | Strella et al. | 428/418 |
| 4,257,699 | 3/1981 | Lentz | 355/3 |
| 4,264,181 | 4/1981 | Lentz et al. | 355/3 |
| 4,272,179 | 6/1981 | Seanor | 355/3 |
| 4,314,043 | 2/1982 | Kojima | 525/102 |
| 4,777,087 | 10/1988 | Heeks et al. | 428/321.1 |
| 4,853,737 | 8/1989 | Hartly et al. | 355/289 |
| 5,141,788 | 8/1992 | Badesha et al. | 428/36.8 |
| 5,166,031 | 11/1992 | Badesha et al. | 430/124 |
| 5,337,129 | 8/1994 | Badesha | 355/275 |
| 5,340,679 | 8/1994 | Badesha et al. | 430/126 |

FOREIGN PATENT DOCUMENTS

| | | |
|---|---|---|
| 0455470 | 11/1991 | European Pat. Off. . |
| 0492416 | 7/1992 | European Pat. Off. . |
| 0492402 | 7/1992 | European Pat. Off. . |
| 0507468 | 10/1992 | European Pat. Off. . |
| 0619532 | 10/1994 | European Pat. Off. . |
| 0619533 | 10/1994 | European Pat. Off. . |

OTHER PUBLICATIONS

"Improving Release Performance of Viton Fuser Rolls" by Henry et al., Xerox Disclosure Journal, vol. 9, #1, Jan./Feb. 1984.

"Viton/RTV Silicone Fuser Release Overcoating", Ferguson et al., Xerox Disclosure Journal, vol. 11, #5, Sep./Oct. 1986.

Primary Examiner—Ralph H. Dean
Attorney, Agent, or Firm—Zosan S. Soong

[57] ABSTRACT

A low surface energy material comprising a volume grafted elastomer which is a substantially uniform integral interpenetrating network of a hybrid composition of a fluoroelastomer and a polyorganosiloxane, said volume graft having been formed by dehydrofluorination of said fluoroelastomer by a nucleophilic dehydrofluorinating agent, followed by a hydrosilation reaction, addition of a hydrogen functionally terminated polyorganosiloxane and a hydrosilation reaction catalyst.

6 Claims, 1 Drawing Sheet

LOW SURFACE ENERGY MATERIAL

CROSS REFERENCE TO RELATED APPLICATIONS

Attention is directed to copending application Ser. No. 155,350 filed Nov. 22, 1993, entitled Radiation Induced Grafting of Polyorganosiloxanes to Fluoroelastomers in the name of Santokh S. Badesha et al.

BACKGROUND OF THE INVENTION

The present invention relates to a low surface energy material particularly for use as a fuser member, a method of fusing toner images in electrostatographic reproducing apparatus and a method for fabricating the fuser member. In particular, it relates to a fuser member which may preferably take the form of a fuser roll, pressure roll or release agent donor roll.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be the photosensitive member itself or other support sheet such as plain paper The use of thermal energy for fixing toner images onto a support member is well known. In order to fuse electroscopic toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, the thermoplastic resin particles are fused to the substrate by heating to a temperature of between about 90° C. to about 160° C. or higher depending upon the softening range of the particular resin used in the toner. It is undesirable, however, to raise the temperature of the substrate substantially higher than about 200° C. because of the tendency of the substrate to discolor at such elevated temperatures, particularly when the substrate is paper.

Several approaches to thermal fusing of electroscopic toner images have been described in the prior art. These methods include providing the application of heat and pressure substantially concurrently by various means: a roll pair maintained in pressure contact; a belt member in pressure contact with a roll; and the like. Heat may be applied by heating one or both of the rolls, plate members or belt members. The fusing of the toner particles takes place when the proper combination of heat, pressure and contact time are provided. The balancing of these parameters to bring about the fusing of the toner particles is well known in the art, and they can be adjusted to suit particular machines or process conditions.

During operation of a fusing system in which heat is applied to cause thermal fusing of The toner particles onto a support, both the toner image and the support are passed through a nip formed between the roll pair, or plate or belt members. The concurrent transfer of heat and the application of pressure in the nip, affects the fusing of the toner image onto the support. It is important in the fusing process that no offset of the toner particles from the support to the fuser member takes place during normal operations. Toner particles offset onto the fuser member may subsequently transfer to other parts of the machine or onto the support in subsequent copying cycles, thus increasing the background or interfering with the material being copied there. The so called "hot offset" occurs when the temperature of the toner is raised to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface which has a low surface energy to provide the necessary release. To ensure and maintain good release properties of the fuser roll, it has become customary to apply release agents to the fuser roll during the fusing operation. Typically, these materials are applied as thin films of, for example, silicone oils to prevent toner offset.

Particularly preferred fusing systems take the form of a heated cylindrical fuser roll having a fusing surface which is backed by a cylindrical pressure roll forming a fusing nip there between. A release agent donor roll is also provided to deliver release agent to the fuser roll. While the physical and performance characteristics of each of these rolls, and particularly of their functional surfaces are not precisely the same depending on the various characteristics of the fusing system desired, the same classes of materials are typically used for one or more of the rolls in a fusing system in a electrostatographic printing system.

One of the earliest and most successful fusing systems involved the use of silicone elastomer fusing surfaces, such as a roll with a silicone oil release agent which could be delivered to the fuser roll by a silicone elastomer donor roll. The silicone elastomers and silicone oil release agents used in such systems are described in numerous patents and fairly collectively illustrated in U.S. Pat. No. 4,777,087 to Heeks et al. While highly successful in providing a fusing surface with a very low surface energy to provide excellent release properties to ensure that the toner is completely released from the fuser roll during the fusing operation, these systems suffer from a significant deterioration in physical properties over time in a fusing environment. In particular, the silicone oil release agent tends to penetrate the surface of the silicone elastomer fuser members resulting in swelling of the body of the elastomer causing major mechanical failure including debonding of the elastomer from the substrate, softening and reduced toughness of the elastomer causing it to chunk out and crumble, contaminating the machine and providing non-uniform delivery of release agent. Furthermore, as described in U.S. Pat. No. 4,777,087, additional deterioration of physical properties of silicone elastomers results from the oxidative crosslinking, particularly of a fuser roll at elevated temperatures.

A more recent development in fusing systems involves the use of fluoroelastomers as fuser members which have a surface with a metal containing filler, which interact with polymeric release agents having functional groups, which interact with the metal containing filler in the fluoroelastomer surface. Such fusing systems, fusing members and release agents, are described in U.S. Pat. No. 4,264,181 to Lentz et al., U.S. Pat. No. 4,257,699 to Lentz and U.S. Pat. No. 4,272,179 to Seanor, all commonly assigned to the assignee of the present invention as well as the two above referenced previously filed copending applications. Typically, the fluoroelastomers are (1) copolymers of vinylidenefluoride and hexafluoropropylene, and (2) terpolymers of vinylidene fluoride, hexafluoropropylene and tetrafluoroethylene. Commercially available materials include: Viton E430, Viton GF and other Viton designations as Trademarks of E. I. Dupont deNemours, Inc. as well as the Fluorel materials of 3M Company. The preferred curing system for these materials is a nucleophilic system with a bisphenol crosslinking agent to generate a covalently crosslinked network polymer formed by the application of heat following basic dehydrofluorination of the copolymer. Exemplary of such fuser member is an aluminum base member with a poly(vinylidenefluoride-hexafluoropropylene) copolymer cured with a bisphenol curing agent having lead oxide filler dispersed therein and utilizing a mercapto functional polyorganosiloxane oil as a release agent. In those fusing processes, the polymeric release agents have functional groups (also designated as chemically reactive functional groups) which interact with the metal containing filler dispersed in the elastomer or resinous material of the fuser member surface to form a thermally stable film which releases thermoplastic resin toner and which prevents the thermoplastic resin toner from contacting the elastomer material itself. The metal oxide, metal salt, metal alloy or other suitable metal compound filler dispersed in the elastomer or resin upon the fuser member surface interacts with the functional groups of the polymeric release agent. Preferably, the metal containing filler materials do not cause degradation of or have any adverse effect upon the polymeric release agent having functional groups. Because of this reaction between The elastomer having a metal containing filler and the polymeric release agent having functional groups, excellent release and the production of high quality copies are obtained even at high rates of speed of electrostatographic reproducing machines.

The preferred elastomers are the fluoroelastomers and the most preferred fluoroelastomers are the vinylidenefluoride based fluoroelastomers which contain hexafluoropropylene and tetrafluoroethylene as comonomers. Two of the most preferred fluoroelastomers are (1) a class of copolymers of vinylidenefluoride and hexafluoropropylene known commercially as Viton A and (2) a class of terpolymers of vinylidenefluoride, hexafluoropropylene and tetrafluoroethylene known commercially as Viton B. Viton A and Viton B and other Viton designations are trademarks of E. I. DuPont deNemours and Company. Other commercially available materials include Fluorel of 3M Company, Viton GH, Viton E60C, Viton B 910, and Viton E 430. The preferred curing system is a nucleophilic system with a bisphenol crosslinking agent to generate a covalently cross-linked network polymer formed by the application of heat following basic dehydrofluorination of the copolymer. The nucleophilic curing system also includes an organophosphonium salt accelerator. Some of the commercially available fluoroelastomer polymers which can be cured with the nucleophilic system are Viton E 60C, Viton B 910, Viton E 430, Viton A, Viton B, Viton GF.

The use of polymeric release agents having functional groups which interact with a fuser member to form a thermally stable, renewable self-cleaning layer having superior release properties for electroscopic thermoplastic resin toners is described in U.S. Pat. Nos. 4,029,827 to Imperial et al., 4,101,686 to Strella et al. and 4,185,140 also to Strella et al. all commonly assigned to the assignee of the present invention. In particular, U.S. Pat. No. 4,029,827 is directed to the use of polyorganosiloxanes having mercapto functionality as release agents. U.S. Pat. Nos. 4,101,686 and 4,185,140 are directed to polymeric release agents having functional groups such as carboxy, hydroxy, epoxy, amino, isocyanate, thioether, and mercapto groups as release fluids.

While the mechanism involved in these fusing systems is not completely understood, it has been observed that when certain polymeric fluids having functional groups are applied to the surface of a fusing member having an elastomer surface with a metal oxide, metal salt, metal, metal alloy or other suitable metal compounds dispersed therein, there is an interaction (a chemical reaction, coordination complex, hydrogen bonding or other mechanism) between the metal ion of the filler in the elastomer and the polymeric fluid having functional groups so that the polymeric release agent having functional groups in the form of a liquid or fluid provides an excellent surface for release which having an excellent propensity to remain upon the surface of the fuser member. Regardless of the mechanism there appears to be the formation of a film upon the elastomer surface which differs from the composition of the elastomer and the composition of the polymeric release agent having functional groups. This film, however, has a greater affinity for the elastomer containing a metal compound than the toner and thereby provides an excellent release coating upon the elastomer surface. The release coating has a cohesive force which is less than the adhesive forces between heated toner and the substrate to which it is applied and the cohesive forces of the toner. The interaction between the functional group of the polymeric release agent and the metal ion of the elastomer containing metal leads to an overall diminution of the critical or high surface energy of the metal in the metal containing filler.

While these fluoroelastomers have excellent mechanical and physical properties in that they typically have a long wearing life maintaining toughness .and strength over time in a fusing environment, they can only be used with very expensive functional release agents and have to contain expensive interactive metal containing fillers. Typically, for example, the functional release agents are of the order of four times as expensive as their nonfunctional conventional silicone oil release agents.

PRIOR ART

Attempts have been made to combine the advantages of each of these fusing systems.

U.S. Pat. No. 5,141,788 to Badesha et al., describes a fuser member comprising a supporting substrate having an outer layer of a cured fluoroelastomer having a thin surface layer of a polyorganosiloxane having been grafted to the surface of the cured fluoroelastomer in the presence of a dehydrofluorinating agent for the fluoroelastomer and having the active functionality from a hydrogen hydroxy, alkoxy, amino, epoxy, vinyl, acrylic or mercapto group.

U.S. Pat. No. 5,166,031 to Badesha et al., is directed to a fuser member comprising a supporting substrate having an outer layer of a volume grafted elastomer which is a substantially uniform integral interpenetrating network of a hybrid composition of a fluoroelastomer and a polyorganosiloxane which is formed by dehydrofluorination of the fluoroelastomer by a nucleophilic dehydrofluorinating agent followed by addition polymerization by the addition of an alkene or alkyne functionally terminated polyorganosiloxane and a polymerization initiator.

SUMMARY OF THE INVENTION

The present invention is directed to an alternative to the volume grafted elastomer described in the above identified U.S. Pat. No. 5,166,031. More specifically, it is directed to a volume grafted elastomer which has a silicon carbon bonding rather than a carbon carbon bonding which is more stable than the carbon carbon bonding both chemically and thermally, which is less reactive and in particular less susceptible to thermal and chemical degradation: A silicon-carbon bond is considerably more heat stable from a carbon-carbon bond which is an advantage in high temperature application as in a fuser. Similarly, a silicon-carbon bond is more stable to chemical attack by toner additives as compared to a carbon-carbon bond. A silicon-carbon bond will also service better when it is exposed to a combination of heat and chemical attack. Further, a stronger bond between the carbon and silicon based components is provided than the bond between carbon and carbon bond components and it uses a less expensive siloxane during the manufacture.

In a principle aspect of the present invention, the low surface energy material, the fuser member and fusing system employing the same has an outer layer of a volume grafted elastomer which is a substantially uniform integral interpenetrating network of a hybrid composition of a fluoroelastomer and a polyorganosiloxane, said volume graft having been formed in a two step process by first dehydrofluorination of said fluoroelastomer by a nucleophilic dehydrofluorinating agent, followed by a hydrosilation reaction by the addition of a hydrogen functionally terminated polyorganosiloxane and a hydrosilation reaction catalyst.

In a further aspect of the present invention, the fluoroelastomer is selected from the group consisting of poly(vinylidene fluoride-hexafluoropropylene) and poly(vinylidene-hexafluoropropylene-tetrafluoroethylene).

In a further aspect of the present invention, the polyorganosiloxane has the formula:

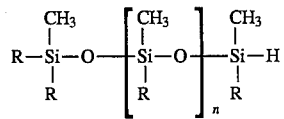

where R is hydrogen or an alkyl, alkenyl or aryl having less than 19 carbon atoms or an aryl group substituted with an amino, hydroxy, mercapto or alkyl or alkenyl group having less than 19 carbon atoms and n is 2 to 350.

In accordance with a principle aspect of the present invention, a long life user member together with a method of making the fuser member and a fusing system in which it may be used is provided which does not require the use of functional release agents or the presence of metal containing fillers in the fuser member to interact with the functional release agent.

In a further aspect of the present invention, the dehydrofluorinating agent is selected from the group consisting of primary, secondary and tertiary aliphatic and aromatic amines where the aliphatic and aromatic groups have from 2 to 15 carbon atoms, and aliphatic and aromatic diamines and triamines, having from 2 to 15 carbon atoms.

In a further aspect of the present invention, the amine dehydrofluorinating agent is selected from the group consisting of N-(2 aminoethyl-3-aminopropyl)-trimethoxy silane, 3-(N-styrylmethyl-2-aminoethylamino) propyltrimethoxy silane hydrochloride and (aminoethylamino methyl) phenethyltrimethoxy silane.

In a further aspect of the present invention, the hydrosilation reaction catalyst is elected from the group consisting of the acids of platinum and paladium such as chloroplatinic acid.

In a further aspect of the present invention, the supporting substrate is a cylindrical sleeve, having an outer layer of from 12.5 to about 125 micrometers thick.

In a further aspect of the present invention, the fuser member includes an intermediate elastomer layer such as a silicone or fluoroelastomer layer and the volume grafted layer is an overcoating.

In a further aspect of the present invention, the fuser member is used as pressure roll, fuser roll or release agent donor roll.

Figure 1:
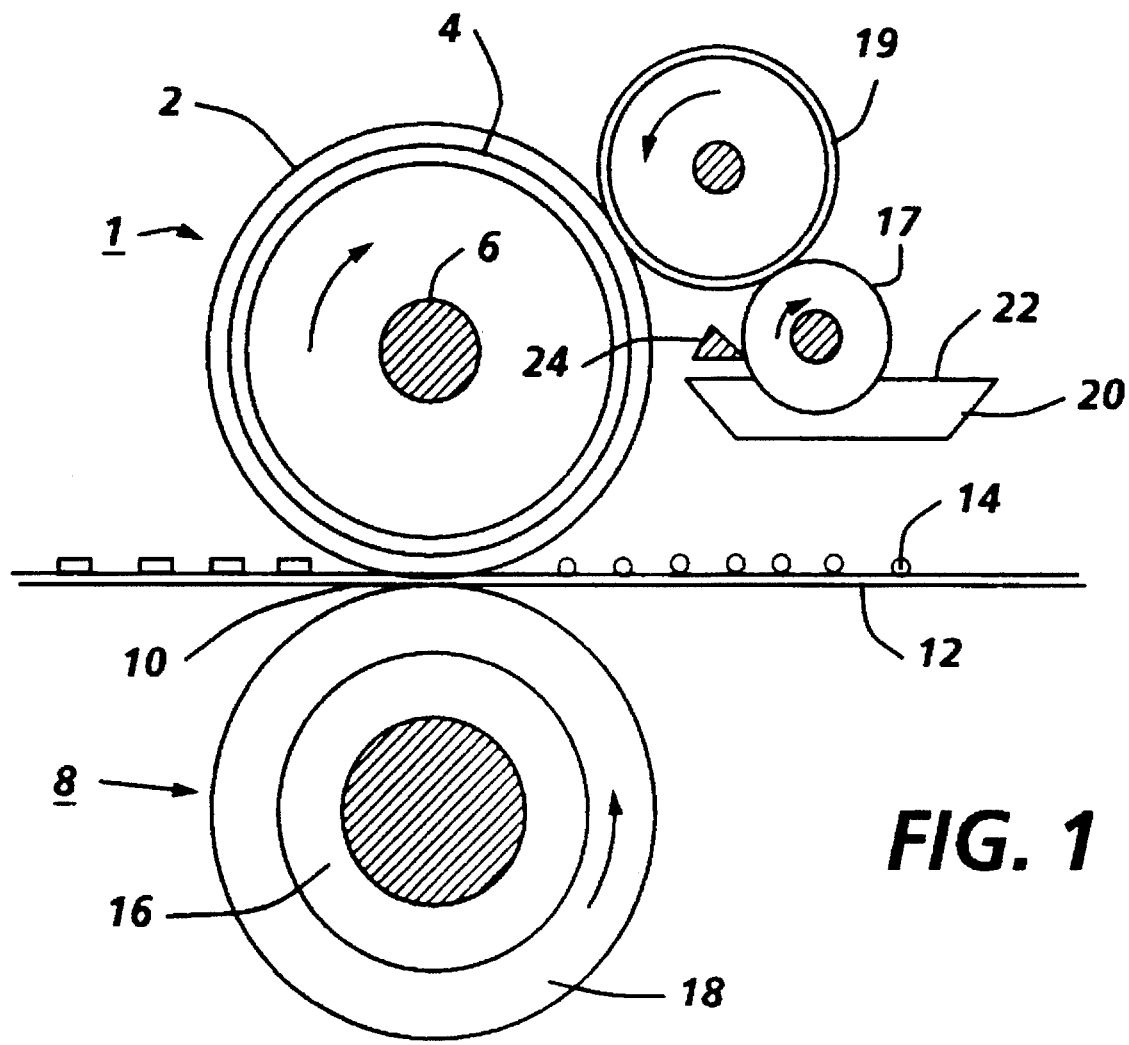
FIG. 1 is a sectional view of a fuser system which may use the fuser member of the present invention.

By the term volume graft, it is intended to define a substantially uniform integral interpenetrating network of a hybrid composition, wherein both the structure and the composition of the fluoroelastomer and polyorganosiloxane are substantially uniform when taken through different slices of the fuser member.

The term interpenetrating network is intended to define the hydrosilation reaction matrix where the fluoroelastomer and polyorganosiloxane polymer strands are intertwined in one another.

The term hybrid composition is intended to define a volume grafted composition which is comprised of fluoroelastomer and polyorganosiloxane blocks randomly arranged.

DETAILED DESCRIPTION OF THE PRESENT INVENTION

A typical fuser member of the present invention is described in conjunction with a fuser assembly as shown in FIG. 1 where the numeral 1 designates a fuser roll comprising elastomer surface 2 upon suitable base member 4 which is a hollow cylinder or core fabricated from any suitable metal such as aluminum, anodized aluminum, steel, nickel, copper, and the like, having a suitable heating element 6 disposed in the hollow portion thereof which is coextensive with the cylinder. Backup or pressure roll 8 cooperates with fuser roll 1 to form a nip or contact arc 10 through which a copy paper or other substrate 12 passes such that toner images 14 thereon contact elastomer surface 2 of fuser roll 1. As shown in FIG. 1, the backup roll 8 has a rigid steel core 16 with an elastomer surface or layer 18 thereon. Sump 20 contains polymeric release agent 22 which may be a solid or liquid at room temperature, but it is a fluid at operating temperatures.

In the embodiment shown in FIG. 1 for applying the polymeric release agent 22 to elastomer surface 2, two release agent delivery rolls 17 and 19 rotatably mounted in the direction indicated are provided to transport release agent 22 from the sump 20 to the elastomer surface. As illustrated in FIG. 1, roll 17 is partly immersed in the sump 20 and transports on its surface release agent from the sump to the delivery roll 19. By using a metering blade 24 a layer of polymeric release fluid can be applied initially to delivery roll 19 and subsequently to elastomer 2 in controlled thickness ranging from submicrometer thickness to thickness of several micrometers of release fluid. Thus, by metering device 24, about 0.1 to 2 micrometers or greater thicknesses of release fluid can be applied to the surface of elastomer 2.

The low surface energy material described herein, while useful in many applications, has particular application as a fuser member which may be a roll, belt, flat surface or other suitable shape used in the fixing of thermoplastic toner images to a suitable substrate. It may take the form of a fuser member, a pressure member or a release agent donor member, preferably in the form of a cylindrical roll. Typically, the fuser member is made of a hollow cylindrical metal core, such as copper, aluminum, steel and the like, and has an outer layer of the selected cured fluoroelastomer. Alternatively, there may be one or more intermediate layers between the substrate and the outer layer of the cured elastomer if desired. Typical materials having the appropriate thermal and mechanical properties for such layers include silicone elastomers, fluoroelastomers, EPDM and Teflon PFA sleeved rollers.

The volume grafting according to the present invention is performed in two steps, the first involves the dehydrofluorination of the fluoroelastomer preferably using an amine. During this step hydrofluoric acid is eliminated which generates unsaturation, carbon to carbon double bonds, on the fluoroelastomer. The second step is the catalyzed hydrosilation reaction of the hydrogen terminated polyorganosiloxane with the carbon to carbon double bonds of the fluoroelastomer.

The fluoroelastomers useful in the practice of the present invention are those described in detail in the above referenced U.S. Pat. No. 4,257,699 to Lentz, as well as those described in commonly assigned copending application Ser. No. 07/405,392, now U.S. Pat. No. 5,017,432 and 07/516, 950 now U.S. Pat. No. 5,061,965. As described therein these fluoroelastomers, particularly from the class of copolymers and terpolymers of vinylidenefluoride hexafluoropropylene and tetrafluoroethylene, known commercially under various designations as Viton A, Viton E, Viton E60C, Viton E430, Viton 910, Viton GH and Viton GF. The Viton designation is a Trademark of E. I. Dupont deNemours, Inc. Other commercially available materials include Fluorel 2170, Fluorel 2174, Fluorel 2176, Fluorel 2177 and Fluorel LVS 76, Fluorel being a Trademark of 3M Company. Additional commercially available materials include Fluorel II (LII900) a poly(propylene-tetrafluoroethylene-vinylidenefluoride) also available from 3M Company as well as the Tecnoflons identified as FOR-60KIR, FOR-LHF, NM, FOR-THF, FOR-TFS, TH, TN505 available from Montedison Specialty Chemical Co. Typically, these fluoroelastomers are cured with a nucleophilic addition curing system, such as a bisphenol crosslinking agent with an organophosphonium salt accelerator as described in further detail in the above referenced Lentz Patent, and in U.S. Pat. No. 5,017,432.

In a particularly preferred embodiment, the fluoroelastomer is one having a relatively low quantity of vinylidenefluoride, such as in Viton GF, available from E. I. Dupont deNemours, Inc. The Viton GF has 35 weight percent vinylidenefluoride, 34 weight percent hexafluoropropylene and 29 weight percent tetrafluoroethylene with 2 percent cure site monomer. It is generally cured with a conventional aliphatic peroxide curing agent.

The polyorganosiloxane having functionality according to the present invention has the formula:

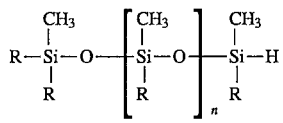

where R is hydrogen or an alkyl, alkenyl or aryl having less than 19 carbon atoms or an aryl group substituted with an amino, hydroxy, mercapto or an alkyl or alkenyl group having less than 19 carbon atoms and n is 2 to 350. In the above formula, typical R groups include methyl, ethyl, propyl, octyl, vinyl, allylic, crotnyl, phenyl, naphthyl and phenanthryl and typical substituted aryl groups are substituted in the ortho, meta and para positions with lower alkyl groups having less than 15 carbon atoms. Typical examples include hydride terminated polydimethylsiloxane. Furthermore, in a preferred embodiment n is between 60 and 80 to provide a sufficient number of reactive groups to graft onto the fluoroelastomer.

The dehydrofluorinating agent which attacks the fluoroelastomer generating unsaturation is selected from the group of strong nucleophilic agents such as peroxides, hydrides, bases, oxides, etc. The preferred agents are selected from the group consisting of primary, secondary and tertiary, aliphatic and aromatic amines, where the aliphatic and aromatic groups have from 2 to 15 carbon atoms. It also includes aliphatic and aromatic diamines and triamines having from 2 to 15 carbon atoms where the aromatic groups may be benzene, toluene, naphthalene or anthracene etc. It is generally preferred for the aromatic diamines and triamines that the aromatic group be substituted in the ortho, meta and para positions. Typical substituents include lower alkylamino groups such as ethylamino, propylamino and butylamino with propylamino being preferred. Specific amine dehydrofluorinating agents include N-(2 aminoethyl-3-aminopropyl)-trimethoxy silane, 3-(N-strylmethyl-2-aminoethylamino) propyltrimethoxy silane hydrochloride and (aminoethylamino methyl) phenethyltrimethoxy silane.

Other adjuvants and fillers may be incorporated in the elastomer in accordance with the present invention as long as they do not affect the integrity of the fluoroelastomer. Such fillers normally encountered in the compounding of elastomers include coloring agents, reinforcing fillers, crosslinking agents, processing aids, accelerators and polymerization initiators. Following coating of the fluoroelastomer on the substrate, it is subjected to a step curing process at about 93° C. for 2 hours followed by 2 hours at 149° C., followed by 2 hours at 177° C., followed by 2 hours at 208° C. and 16 hours at 232° C.

The dehydrofluorinating agent generates double bonds by dehydrofluorination of the fluoroelastomer compound so that when the hydrogen functionally terminated polyorganosiloxane and catalyst are added the hydrosilation reaction is initiated. The hydrosilation reaction may be generally illustrated as follows:

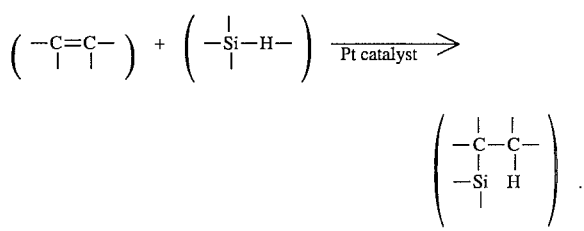

The catalyst for the hydrosilation reaction wherein an SiH group is added across the double bond formed in the fluoroelastomer by the dehydrofluorinating agent is typically taken from the platinic acid family and includes such catalysts as chloroplatinic acids and their complexes.

The substrate for the fuser member according to the present invention may be of any suitable material. Typically, it takes the form of a cylindrical tube of aluminum, steel or certain plastic materials chosen to maintain rigidity, instructural integrity, as well as being capable of having the silicone elastomer coated thereon and adhered firmly thereto. Typically, the fuser members may be made by injection, compression or transfer molding, or they may be extruded. In a typical procedure the core which may be a steel cylinder is degreased with a solvent and cleaned with an abrasive cleaner prior to being primed with a primer such as Dow Corning 1200 which may be sprayed, brushed or dipped followed by air drying under ambient conditions for thirty minutes and then baked at 150° C. for 30 minutes. A silicone elastomer intermediate layer may be applied according to conventional techniques such as injection molding and casting after which it is cured for up to 15 minutes and at 120 to 180 degrees Centigrade to provide a complete cure without a significant post cure operation. This curing operation should be substantially complete to prevent debonding of the silicone elastomer from the core when it is removed from the mold. Thereafter the surface of the silicone elastomer is sanded to remove the mold release agent and it is wiped clean with a solvent such as Isopropyl alcohol to remove all debris.

The outer layer of the fuser member is preferably prepared by dissolving the fluoroelastomer in a typical solvent, such as methyl ethyl ketone, methyl isobutyl ketone and the like, followed by stirring for 15 to 60 minutes at 45°–85° C. after which the polyorganosiloxane and platinum catalyst are added with stirring for 30 minutes to 10 hours at a temperature of 45°–85° C. A nucleophilic curing agent such as, Viton Curative No. 50, which incorporates an accelerator, (a quarternary phosphonium salt or salts) and a crosslinking agent, bisphenol AF in a single curative system is added in a 3 to 7 percent solution predissolved in the fluoroelastomer compound. Optimally, the basic oxides, MgO and $(Ca(OH)_2$ can be added in particulate form to the solution mixture. Providing the layer on the fuser member substrate is most conveniently carried out by spraying, dipping or the like a solution of the homogeneous suspension of the fluoroelastomer and polyorganosiloxane to a level of film of about 12.5 to about 125 micrometers in thickness. This thickness range is selected as providing a layer thin enough to prevent a large thermal barrier for fusing and thick enough to allow a reasonable wear life. While molding, extruding, flow coating and wrapping techniques are alternative means which may be used, we prefer to spray successive applications of the solvent solution. When the desired thickness of coating is obtained, the coating is cured and thereby bonded to the roll surface. A typical step curing process is heating for two hours at 93° C. followed by 2 hours at 149° C. followed by 2 hours at 177° C. followed by 2 hours at 208° C. and 16 hours at 232° C.

In an alternative procedure, the solvent may be removed by evaporation by known means, the residue rinsed with a hydrocarbon solvent such as hexane to remove unwanted reactants, if any, and the residue redesolved in the original solvent followed by the addition of Curative No. 50 and the subsequent formation of the outer layer.

By low surface energy material we intend to define one having a surface energy in the 20–23 dynes/cm range similar to that for unfilled silicone rubber. Due to the low surface energy nature of the grafted silicone it wants to wet the fluoroelastomer surface and thereby also enhances the compatability with subsequently applied silicone oil release agent.

The following Examples further define and describe fuser members prepared by the present invention and illustrate preferred embodiment of the present invention. Unless otherwise indicated, all parts and percentages are by weight.

EXAMPLE I

An aluminum cylindrical sleeve was abraded with sand paper, followed by degreasing, scrubbing with an abrasive cleaner and thoroughly washing with water. A primer Dow Corning primer DC1200 was applied to a thickness of 2 to 3 tenths of a mil. (5 to 7.5 micrometer), air dried at ambient conditions for 30 minutes and baked at 150° C. for 30 minutes. Subsequently, the primed core was provided with an intermediate layer of a liquid injection molded silicone elastomer by molding Dow Corning LSR590 to the primed core to a thickness of about 0.25 inches. The silicone elastomer was cured for 10–15 minutes at 150° C. but was not post cured. Following removal of the roll from the mold, the mold release material was The hydride silicone graft was prepared in the following manner. Part A was prepared by dissolving 250 g of Viton GF in 2.5 liters of methylethyl ketone (MEK) by stirring at room temperature. This is accomplished by using a four liter plastic bottle and a moving base shaker. It takes approximately one hour to two hours to accomplish the dissolution depending upon the speed of the shaker. The above solution is then transferred to a four liter Erlenmyer flask and 25 ml of the amine dehydrofluorinating agent, N-(2 aminoethyl)-3-amino propyltri-methoxysilane hydrochloride A1100, available from Huls America Inc. Piscataway, N.J.) was added. The contents of the flask were then stirred using a mechanical stirrer while maintaining the temperature between 55 and 60 degrees centigrade. After stirring for 30 minutes, 50 ml of 100 centistoke hydride functionally terminated polysiloxane (PS-545) a hydride terminated polydimethyl siloxane plus chloroplatinic acid catalyst, both available from Huls America Inc., were added and the stirring continued while heating the contents of the flask around 75 degrees Centigrade for another 4 hours. During this time the color of the solution turned light yellow which then was cooled to room temperature. To this solution was then added 5 grams of magnesium oxide, 2.5 grams of calcium hydroxide and 12.5 grams of curative VC-50 available from Dow Chemical Co. The above mixture was then ball jarred with ceramic balls as media for 17 hours. The mixture was diluted to 5 liters with methylethyl ketone. A portion of this dispersion (less than 2 liters) was spray coated onto a 10 in.×14 in. steel substrate (3 ml thick). The dry film was then removed by peeling from the substrate and was cured by the following heating procedure: 2 hours at 93° C., 2 hours at 149° C., 2 hours at 177° C., and 16 hours at 208° C. The thickness of the cured film as determined by permoscope was found to be 16.4 mils. The mechanical properties as determined by Instron Model 1123 (standard test protocol ASTM 412) showed the toughness to be 1397 lbs.-in./in.$^3$ and an initial modulus of 294 psi. Next, a portion of the above dispersion (less than 1 liter) was sprayed to a dry thickness of 1.5 mls onto the aluminum sleeve having the Technoflon 421 intermediate layer. The resulting roll was then cured by the following heating profile: 2 hours at 93° C., 2 hours at 149° C., 2 hours at 177° C., and thereafter heating for 16 hours at 208° C. This roll was then cooled to room temperature. The roll was characterized as follows:

X-ray Photoelectron Spectroscopy Characterization of the Volume Grafted Surface

1. Preparation of Surface

The volume grafted surface was sequentially extracted with hexane or 90/10 hexane/methyl ethyl ketone mixed solvent 3–4 times to remove unreacted fluoroelastomer and siloxane.

2. XPS Characterization

The extracted surface was then examined with X-ray photoelectron spectroscopy which provide the chemical composition of the topmost 5–10 nanometers surface layer. The surface was then sliced two times and XPS analysis indicated that polysiloxane is uniformly distributed through the fluoroelastomer film.

3. Surface Energy Characterization

The surface energy was found to be 23 dynes/cm as measured by Goniameter available from Rume/Hart Inc. of New Jersey.

Thus, according to the present invention a low surface energy material has been provided which is capable of multiple and varied uses but for us has particular application as a fuser member, for example, such as a fuser roll, donor roll or pressure roll, in a fusing system which does not require the use of a functional release agent or the presence of a metal containing filler in the transport surface of the fuser member to interact with the functional release agent to form a release layer. This enables an economical fusing system combining the advantages of fluoroelastomer fuser member surfaces and nonfunctional conventional silicone release agent.

In addition the silicon carbon bond formed provides a more chemically and thermally stable material which is less susceptible to acidic and basic environments. Furthermore, the hydrogen functionally terminated polyorganosiloxane is less expensive than alkene or alkyne terminated polyorganosiloxanes and the hydrosilation reaction may be carried out at a lower temperature and for a shorter time than the addition polymerization reaction. For example while it has been described generally as a fuser member it has application in other low surface energy such as developer rolls, intermediate transfer belts and the like.

All the patents and applications referred to herein are hereby specifically, and totally incorporated herein by reference in their entirety in the instant specification.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A low surface energy material comprising an elastomer composition which is a substantially uniform integral interpenetrating network of a hybrid composition of a fluoroelastomer and a polyorganosiloxane, said elastomer composition having been formed by dissolving said fluoroelastomer in a solvent and by dehydrofluorination of said fluoroelastomer by a nucleophilic dehydrofluorinating agent to increase the number of double bond sites, followed by a hydrosilation reaction by the addition of a hydrogen functionally terminated polyorganosiloxane and a hydrosilation reaction catalyst, wherein the polyorganosiloxane is grafted to the dehydrofluorinating agent subjected fluoroelastomer at the double bond sites.

2. The low surface energy material of claim 1 wherein said fluoroelastomer is selected from the group consisting of poly(vinylidene fluoride-hexafluoropropylene) and poly(vinylidene fluoride-hexafluoropropylene-tetrafluoroethylene).

3. The low surface energy material of claim 1 wherein said polyorganosiloxane has the formula:

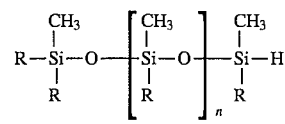

where R is hydrogen or an alkyl, alkenyl or aryl having less than 19 carbon atoms or an aryl group substituted with member selected from the group consisting of amino, hydroxy, mercapto, alkyl, and alkenyl, wherein the alkyl or alkenyl group contains less than 19 carbon atoms and n is 2 to 350.

4. The low surface energy material of claim 1 wherein said dehydrofluorinating agent is selected from the group consisting of primary, secondary and tertiary aliphatic and aromatic amines where the aliphatic and aromatic groups have from 2 to 15 carbon atoms and aliphatic and aromatic diamines and triamines having from 2 to 15 carbon atoms.

5. The low surface energy material of claim 4 wherein said amine dehydrofluorinating agent is selected from the group consisting of N-(2 aminoethyl-3-aminopropyl)-trimethoxy silane, 3-(N-styrylmethyl-2-aminoethylamino) propyltrimethoxy silane hydrochloride and (aminoethylamino methyl) phenethyltrimethoxy silane.

6. The low surface energy material of claim 1 wherein the catalyst is a platinum catalyst.

* * * * *